United States Patent
Fidaleo et al.

(10) Patent No.: US 12,003,821 B2
(45) Date of Patent: Jun. 4, 2024

(54) TECHNIQUES FOR ENHANCED MEDIA EXPERIENCE

(71) Applicant: DISNEY ENTERPRISES, INC., Burbank, CA (US)

(72) Inventors: Douglas A. Fidaleo, Santa Clarita, CA (US); Michael P. Goslin, Sherman Oaks, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/853,451

(22) Filed: Apr. 20, 2020

(65) Prior Publication Data

US 2021/0329342 A1  Oct. 21, 2021

(51) Int. Cl.
*H04N 7/16* (2011.01)
*H04N 21/431* (2011.01)
*H04N 21/478* (2011.01)
*H04N 21/84* (2011.01)

(52) U.S. Cl.
CPC ....... *H04N 21/478* (2013.01); *H04N 21/4316* (2013.01); *H04N 21/84* (2013.01)

(58) Field of Classification Search
CPC .. H04N 21/478; H04N 21/4316; H04N 21/84; H04N 21/44218; H04N 21/4666; H04N 21/8133; H04N 21/4722
See application file for complete search history.

(56) References Cited

U.S. PATENT DOCUMENTS

| | | | |
|---|---|---|---|
| 6,463,585 B1 * | 10/2002 | Hendricks | H04N 7/0884 725/35 |
| 7,146,627 B1 * | 12/2006 | Ismail | H04N 21/4663 725/35 |
| 8,171,509 B1 * | 5/2012 | Girouard | H04N 21/812 725/32 |
| 9,038,107 B2 * | 5/2015 | Khoo | H04N 5/44543 725/46 |
| 9,602,884 B1 * | 3/2017 | Eldering | H04N 21/4668 |
| 9,785,684 B2 | 10/2017 | Allen | |
| 10,078,917 B1 | 9/2018 | Gaeta et al. | |
| 10,357,881 B2 | 7/2019 | Faridi et al. | |
| 2002/0059584 A1 * | 5/2002 | Ferman | G06F 16/40 |
| 2004/0098747 A1 * | 5/2004 | Kay | H04N 7/17318 348/E7.071 |
| 2005/0149987 A1 * | 7/2005 | Boccon-Gibod | H04N 7/17318 348/E7.071 |
| 2006/0168616 A1 * | 7/2006 | Candelore | H04N 21/4344 725/35 |

(Continued)

OTHER PUBLICATIONS

Advisory Action received for U.S. Appl. No. 16/049,745, dated Apr. 10, 2020, 7 pages.

(Continued)

*Primary Examiner* — Annan Q Shang
(74) *Attorney, Agent, or Firm* — Artegis Law Group, LLP (57) ABSTRACT

The present disclosure sets forth a technique for providing supplemental content along with source media. The technique includes receiving source media and content metadata associated with the source media, generating supplemental content based on the content metadata and preferences of one or more media consumers, and delivering the supplement content along with the source media to the one or more media consumers.

19 Claims, 4 Drawing Sheets

(56) References Cited

U.S. PATENT DOCUMENTS

| | | | |
|---|---|---|---|
| 2007/0094041 A1 | 4/2007 | Coale et al. | |
| 2010/0306655 A1 | 12/2010 | Mattingly et al. | |
| 2011/0069940 A1* | 3/2011 | Shimy | H04N 21/42201 386/296 |
| 2012/0127284 A1 | 5/2012 | Bar-Zeev et al. | |
| 2012/0185886 A1* | 7/2012 | Charania | H04N 21/8173 725/2 |
| 2012/0324492 A1* | 12/2012 | Treadwell, III | H04H 60/45 725/10 |
| 2012/0324494 A1* | 12/2012 | Burger | H04N 21/25891 725/12 |
| 2014/0007157 A1* | 1/2014 | Harrison | H04L 63/102 725/32 |
| 2014/0143806 A1* | 5/2014 | Steinberg | H04N 21/6125 725/34 |
| 2014/0279050 A1 | 9/2014 | Makar et al. | |
| 2015/0032766 A1 | 1/2015 | Greenbaum | |
| 2015/0095277 A1 | 4/2015 | Tristan et al. | |
| 2015/0113570 A1* | 4/2015 | Klarfeld | H04N 5/76 725/58 |
| 2015/0302639 A1 | 10/2015 | Malekian et al. | |
| 2015/0328550 A1 | 11/2015 | Herzig et al. | |
| 2016/0151917 A1 | 6/2016 | Faridi et al. | |
| 2016/0294739 A1 | 10/2016 | Stoehr et al. | |
| 2016/0378861 A1 | 12/2016 | Eledath et al. | |
| 2017/0076498 A1 | 3/2017 | Dakss et al. | |
| 2017/0344532 A1 | 11/2017 | Zhou et al. | |
| 2017/0351768 A1* | 12/2017 | Nagao | G06F 16/436 |
| 2018/0052885 A1 | 2/2018 | Gaskill et al. | |
| 2018/0150749 A1 | 5/2018 | Wu et al. | |
| 2018/0165596 A1 | 6/2018 | Abrams et al. | |
| 2018/0192108 A1* | 7/2018 | Lyons | G06F 16/219 |
| 2019/0174172 A1* | 6/2019 | Eubanks | H04N 21/4316 |
| 2019/0230387 A1* | 7/2019 | Gersten | H04N 21/854 |
| 2019/0282155 A1* | 9/2019 | St Amant | G16H 40/63 |
| 2020/0053416 A1* | 2/2020 | Maltar | H04N 21/8456 |
| 2021/0006870 A1* | 1/2021 | Navin | H04N 21/64322 |
| 2021/0076106 A1* | 3/2021 | Marten | G09B 7/08 |
| 2021/0133160 A1* | 5/2021 | Craft | G06F 16/148 |

OTHER PUBLICATIONS

Advisory Action received for U.S. Appl. No. 16/049,745, dated Mar. 30, 2021, 5 pages.

Yu Wu et al., "Automatic Chatbot Knowledge Acquisition from Online Forum via Rough Set and Ensemble Learning", FIP International Conference on Network and Parallel Computing, 2008, 5 pages.

Antonella Santangelo et al., "A Virtual Shopper Customer Assistant In Pervasive Environments", 2007, 10 pages.

Non-Final Office Action received for U.S. Appl. No. 15/373,352 dated Jun. 20, 2019, 29 pages.

Final Office Action received for U.S. Appl. No. 15/373,352 dated Oct. 11, 2019, 32 pages.

Non-Final Office Action received for U.S. Appl. No. 15/373,352 dated Jan. 30, 2020, 30 pages.

Final Office Action received for U.S. Appl. No. 15/373,352 dated May 13, 2020, 31 pages.

Non-Final Office Action received for U.S. Appl. No. 15/373,352 dated Dec. 15, 2020, 28 pages.

Non-Final Office Action received for U.S. Appl. No. 16/049,745 dated Jun. 28, 2019, 19 pages.

Final Office Action received for U.S. Appl. No. 16/049,745 dated Jan. 10, 2020, 22 pages.

Non-Final Office Action received for U.S. Appl. No. 16/049,745 dated Jun. 26, 2020, 22 pages.

Final Office Action received for U.S. Appl. No. 16/049,745 dated Jan. 8, 2021, 22 pages.

Final Office Action received for U.S. Appl. No. 15/373,352 dated Dec. 7, 2021, 45 pages.

Bosser et al., "Dialogs Taking into Account Experience, Emotions and Personality", ACM, 2007, pp. 9-12.

Galvão et al., "Persona-AIML: An Architecture Developing Chatterbots with Personality", AAMAS, Proceedings of the Third International Joint Conference on Autonomous Agents and Multiagent Systems, vol. 3, Jul. 2004, pp. 1266-1267.

Notice of Allowance received for U.S. Appl. No. 16/049,745 dated May 18, 2021, 14 pages.

Final Office Action received for U.S. Appl. No. 15/373,352, dated May 3, 2021, 37 pages.

Non Final Office Action received for U.S. Appl. No. 15/373,352 dated Aug. 12, 2021, 38 pages.

Notice of Allowance received for U.S. Appl. No. 15/373,352 dated Apr. 13, 2022, 12 pages.

Non Final Office Action received for U.S. Appl. No. 17/872,937 dated Oct. 5, 2023, 73 pages.

* cited by examiner

TECHNIQUES FOR ENHANCED MEDIA EXPERIENCE

BACKGROUND OF THE INVENTION

Field of the Invention

The various embodiments relate generally to the enhancing of media delivered to a media consumer to provide an enhanced media experience.

Description of the Related Art

Remote serving and streaming of media content to media consumers has become commonplace. In a media serving or streaming system, media content (e.g., audio and/or audiovisual media) is provided over a network or other communication channel to a local media playback device where it can be consumed by one or more media consumers (e.g., one or more listeners or one or more viewers). In its most basic form, the media content is served and/or streamed according to a set schedule by the content provider. Examples of this include most forms of radio, satellite radio, broadcast television, cable television, satellite television, and simulcast systems. In this basic form, each consumer receives the same media content at the same time, subject to broadcast schedules that may differ by time zone and/or the like. In this approach, there is often little opportunity to customize the source media for individual media consumers and/or for the content to be enhanced and/or customized for the individual media consumers except for the local ability of the media consumer to change the channel, pause the media content, enable or disable closed captioning, and/or the like.

In more sophisticated systems, the media consumers are permitted to select the media they wish to consume in an on-demand fashion, so that the media consumers are able to better control when they want to consume the media. In some approaches, the media consumer uses a local storage device (e.g., a digital video recorder (DVR)) on which the media content is streamed and stored for later playback by the media consumer on a content playback device (e.g., a smartphone, a tablet, a television, a media player, and/or the like). In other approaches, the media content is provided on-demand to the media consumer for immediate or near immediate playback on the playback device.

In many systems, one or more mechanisms are available to provide metadata to a media consumer to provide additional information about the source media, to aid the user in selecting media content for consumption, and/or to support targeted advertising. Examples of these approaches include an interactive media guide showing available media content. The media consumer is then able to navigate the interactive media guide (e.g., using buttons on a remote control, verbal commands, and/or the like) to access the metadata, which may include a summary of the source media, a date of publication, information about the director, information about the actors, a genre for the source media, ratings information, and/or the like. Other approaches may include providing the ability for the media consumer to access the metadata during the consumption of the media content to access information about the current actors and the characters they are portraying, information about the participants depicted in the media content, targeted advertising related to products and/or services included in the media content, and/or the like.

And while these metadata features may help enhance the media consumption experience, they are typically passive or reactive in nature as they require the media consumer to overtly access the metadata (e.g., using the remote control). And while the use of media consumption histories and or past interactions of the media consumer may be used to filter the source media and/or the metadata and/or to help recommend source media to consumers, these approaches are at best minimally interactive. Further, they do not provide an immersive experience to the media consumer.

As the foregoing illustrates, what is needed in the art are more effective approaches for enhancing media experiences so as to provide more customized and interactive media experiences.

SUMMARY

One embodiment disclosed herein sets forth a computer-implemented method for providing supplemental content along with source media. The method includes receiving source media and content metadata associated with the source media, generating supplemental content based on the content metadata and preferences of one or more media consumers, and delivering the supplement content along with the source media to the one or more media consumers.

Further embodiments provide, among other things, one or more non-transitory computer-readable storage media and a computing device configured to implement the method set forth above.

At least one technical advantage of the disclosed techniques relative to the prior art is that the disclosed techniques provide a more interactive and immersive media experience. In addition, the disclosed techniques allows for customization of the media consumption experience where supplemental content is provided to the media consumer in real-time based on the source media being consumed as well as the reactions of the media consumer to the source media and the supplemental content, real-time events, and/or the like. Further, the disclosed techniques provide for one or more virtual media consumption companions that are able to consume the source media along with the media consumer and to interact with the media consumer in a way that is customized to the media consumer and the source media being consumed. In addition, the supplemental content generated by the disclosed techniques is better able to interact with media consumers, reinforce emotional responses of media consumers, and/or increase an engagement level of media consumers than prior art approaches. These technical advantages provide one or more technological advancements over prior art approaches.

BRIEF DESCRIPTION OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments of the inventive concepts and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
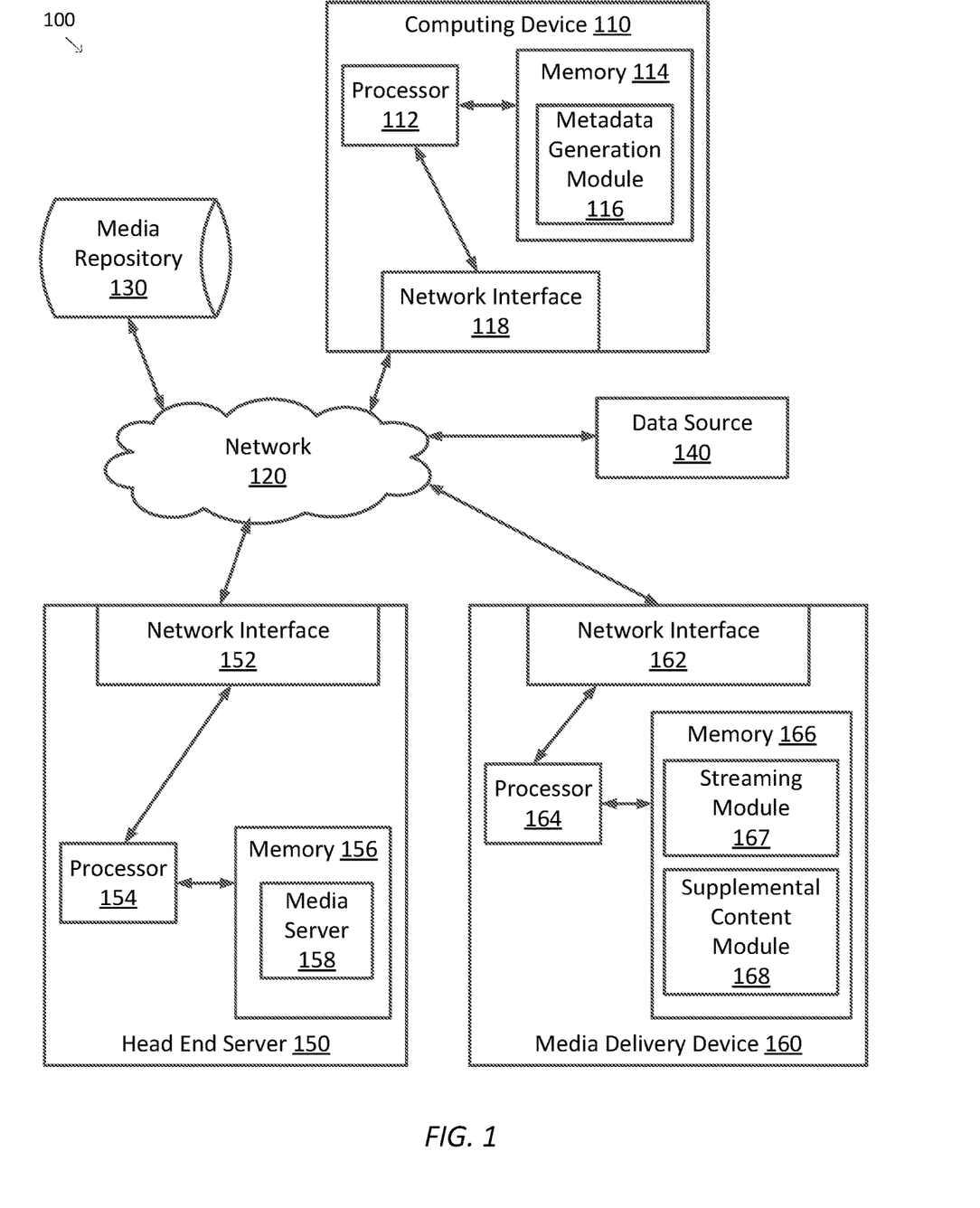
FIG. 1 illustrates a computing system configured to implement one or more aspects of the various embodiments.

FIG. 1 illustrates a computing system 100 configured to implement one or more aspects of the various embodiments. As shown in FIG. 1, computing system 100 includes a computing device 110. Computing device 110 includes a processor 112 coupled to memory 114. Operation of computing device 110 is controlled by processor 112. And although computing device 110 is shown with only one processor 112, it is understood that processor 112 may be representative of one or more central processing units, multi-core processors, microprocessors, microcontrollers, digital signal processors (DSPs), field programmable gate arrays (FPGAs), application specific integrated circuits (ASICs), graphics processing units (CPUs), tensor processing units (TPUs), and/or the like in computing device 110. Computing device 110 may be implemented as a stand-alone subsystem such as a server, as a board added to another computing device, and/or as a virtual machine.

Memory 114 may be used to store software executed by computing device 110 and/or one or more data structures used during operation of computing device 110. Memory 114 may include one or more types of computer-readable storage media. Some common forms of computer-readable storage media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In order to access content (e.g., audio and/or audio-visual media content) and/or other sources of data and information, computing device 110 includes a network interface 118 coupling computing device 110 and processor 112 to a network 120. Network interface 118 may include one or more network interface cards, network interface chips, and/or the like providing support for at least the low-level connectivity to network 120, such as by providing the network access functionality for one or more network types under the TCP/IP protocol and/or the physical and data link layers of the OSI networking model for the one more network types. In some examples, the one or more network types may include wired, fiber optic, and/or wireless network types including Ethernets, fibre channels, and/or the like.

Network 120 may include any type of network, network equipment, and/or the like. In some examples, network 120 may include one or more switches, routers, hubs, gateways, and/or the like. In some examples, network 120 may include one or more local area networks (LANs) (e.g., an Ethernet), one or more wide area networks (e.g., the Internet), and/or the like.

Generating Content Metadata

As shown in FIG. 1, memory 114 includes a metadata generation module 116. And although metadata generation module 116 is characterized as a software module, metadata generation module 116 may be implemented using software, hardware, and/or a combination of hardware and software. Metadata generation module 116 is responsible for generating content metadata to be associated with source media (e.g., audio and/or audio-visual media content). Metadata generation module 116 receives and/or retrieves source media for analysis (e.g., a pod cast, a video, and/or the like). In some examples, metadata generation module 116 may receive and/or retrieve the source media from one or more media repositories 130, which are local to computing device 110 and/or accessible to computing device 110 via network interface 118 and network 120. In some examples, the one or more media repositories may include one or more network attached storage (NAS) devices, storage area networks (SANs), media servers, file servers, databases, and/or the like.

Metadata generation module 116 then scans and/or analyzes the source media using one or analysis modules that may include one or more programs, one or more scripts, one or more rule bases, and/or one or more classification modules. In some examples, the scanning and/or analyzing may identify one or more types of content metadata that may be used to help enhance the consumption (e.g., listening and/or viewing) of the source media by a media consumer. Each of the one or more analysis modules may be used to identify different types of content metadata associated with the source media. In some examples, each of the one more classification modules may include one or more machine learning modules (e.g., one or more neural networks) and/or the like. In some examples, the one or more machine learning modules may be trained based on training data that includes source media and ground truth values for different types of content metadata to be detected. In some examples, the scanning and/or analysis may be performed on the audio within the source media, the video within the source media, the closed captioning text for the source media, and/or the like.

In some examples, the generated content metadata may include global content metadata that applies to the source media as a whole. Non-limiting examples of global content metadata include genre information, content summaries, director information, recoding and/or production date, and/or the like.

In some examples, the generated content metadata may include time-aligned content metadata that is associated with and/or relevant to one or more timestamps and/or one or more time intervals within the source media. Non-limiting examples of time-aligned content metadata include one or more of when characters, participants, and/or actors are present in the source media; when identified objects are present in the source media; when logos and/or other indicia are present in the source media; when meaningful events occur; when actions are being performed; emotional tags (e.g., scary, funny, poignant, etc.) for scenes; and/or the like.

In some embodiments, metadata generation module 116, may solicit and/or use metadata provided by one or more media consumers. In some examples, metadata generation module 116 may provide the source media to a media consumer and periodically pause the source media to query the media consumer to provide metadata associated with the source media. In some examples, metadata generation module 116 may provide the source media to one or more test media consumers and using input devices and/or sensor information to determine the metadata, such as detecting when the one or more test consumers laughs, cries, and/or the like to provide emotional tags for the source media.

In some embodiments, metadata generation module 116 may determine content metadata and/or augment the scanning and/or analyzing of the source media by accessing one or more data sources 140, which may have relevant information or data about the source media. In some examples, the one or more data sources 140 may include one or more third-party databases (e.g., the Internet Movie Database (IMDB), Rotten Tomatoes, and/or the like) that are able to provide data and/or metadata about the source media, one or more content provider data sources, and/or the like. Non-limiting examples of metadata provided by the one or more third-party databases include genre information, content summaries, actor and/or participant information, director information, ratings, and/or the like. Non-limiting examples of metadata provided by the one or more content provider data sources include production information such as camera locations, lighting, digital assets, timestamps and/or time intervals within the source media, and/or the like.

After determining the content metadata, metadata generation module 116 associates the content metadata with the source media and saves the content metadata for later use. In some examples, the content metadata is stored in the one or more media repositories 130.

In some examples, metadata generation module 116 may support the generation of the content metadata in real-time or near real-time so that the enhanced media experience and supplemental content techniques described herein may be applied to live broadcasts and/or live broadcasts provided with a minimal delay.

Figure 2:
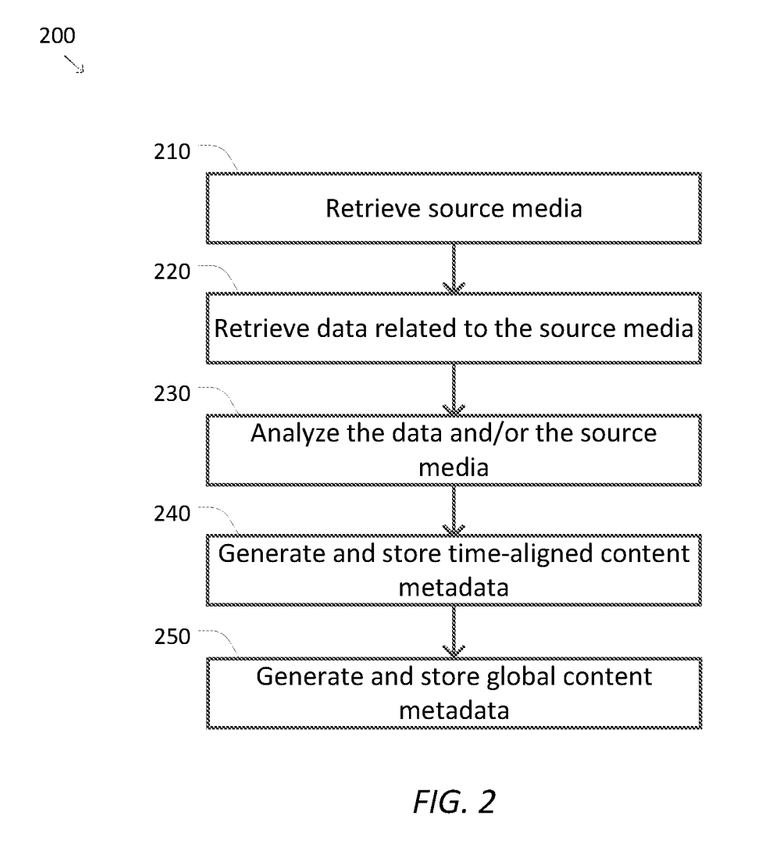
FIG. 2 sets forth a flow diagram of method steps of a method for generating content metadata for source media to implement one or more aspects of the various embodiments.

FIG. 2 sets forth a flow diagram of method steps of a method 200 for generating content metadata for source media to implement one or more aspects of the various embodiments. One or more of the steps of FIG. 2 may be implemented, at least in part, in the form of executable code stored in one or more non-transitory, tangible, computer-readable storage media that when run by one or more processors (e.g., processor 112 in computing device 110) may cause the one or more processors to perform one or more of the steps. In some embodiments, the steps of FIG. 2 may be performed by one or more modules, such as metadata generation module 116. In some embodiments, the steps of FIG. 2 may be used to evaluate source media to identify relevant content metadata to be associated with the source media. Although the steps of FIG. 2 are described with reference to the embodiments of FIG. 1, persons skilled in the art will understand that any system configured to implement the steps of FIG. 2, in any order, falls within the scope of the embodiments. For example, the embodiments of FIG. 2 may be adapted to other arrangements of computing devices, functional blocks and modules, and/or the like.

In some embodiments, the steps of method 200 may be performed in orders other than those implied by the arrangement of the blocks in FIG. 2. In some examples, steps 240 and 250 may be performed in any order and/or concurrently. In some examples, steps 240 and/or 250 may be performed concurrently with step 230.

At a step 210, source media for which content metadata is to be generated is retrieved. In some examples, the source media is retrieved from one or more media repositories, such as any of the one or more media repositories 130. In some examples, the source media to be retrieved is selected from a list of source media for which content metadata is to be generated. In some examples, the source media to be retrieved may be selected by a user of metadata generation module 113 and/or a user operating another computing device. In some examples, the source media is sent to metadata generation module 116 along with a request to generate content metadata for the source media, such as by using an application programming interface (API) of metadata generation module 116. In some examples, the source media may be streamed to metadata generation module 116 in real-time or near-real-time (e.g., with a nominal delay) for real-time or near-real-time generation of the content metadata.

At an optional step 220, data related to the source media is retrieved. In some examples, the data related to the source media may correspond to metadata that describes the source media as a whole and/or a portion of the source media. In some examples, the data may be retrieved from the one or more data sources 140. In some examples, the data may include one or more of genre information, content summaries, actor and/or participant information, director information, ratings, production information and/or the like. In some examples, the production information may include one or more of camera locations, lighting, digital assets, timestamps and/or time intervals within the source media, and/or the like.

At a step 230, the data and/or the source media are analyzed. In some examples, metadata generation module 116 analyzes the data and/or the source media using one or more analysis modules that may include one or more programs, one or more scripts, one or more rule bases, and/or one or more classification modules. In some examples, each of the one more classification modules may include one or more machine learning modules (e.g., one or more neural networks) and/or the like. In some examples, the scanning and/or analyzing may identify one or more types of content metadata that may be used to enhance the consumption (e.g., listening and/or viewing) of the source media by an end media consumer. In some examples, the analysis of the source media may include analyzing one or more of audio within the source media, video within the source media, closed captioning text for the source media, and/or the like. In some examples, the analysis may include soliciting and/or receiving information from one or more test media consumers.

At a step 240, time-aligned content metadata is generated and stored. In some examples, each element of the time-aligned content metadata is associated with and/or relevant to one or more timestamps and/or one or more time intervals within the source media. In some examples, the time-aligned content metadata may include one or more of when characters, participants, and/or actors are present in the source media; when identified objects are present in the source media; when logos and/or other indicia are present in the source media; when meaningful events occur; when actions are being performed; emotional tags (e.g., scary, funny, poignant, etc.) for scenes; and/or the like. Once generated, the time-aligned content metadata is associated with the source media and the timestamps and/or time intervals within the source media. In some examples, the time-aligned content metadata is stored in the one or more media repositories 130. Additionally and/or alternatively to being stored, the time-aligned content metadata may be streamed in real-time and/or near-real-time along with the source media to one or more media consumers.

At a step 250, global content metadata is generated and stored. In some examples, the global content metadata may include one or more of genre information, content summaries, director information, recoding and/or production date, and/or the like. Once generated, the global content metadata is associated with the source metadata. In some examples, the global content metadata is stored in the one or more media repositories 130. Additionally and/or alternatively to being stored, the global content metadata may be streamed in real-time and/or near-real-time along with the source media to one or more media consumers.

Method 200 may then be repeated to generate content metadata for other source media.

Referring back to FIG. 1, computing system 100 further includes a head end server 150. Head end server 150 is representative of one or more head end servers 150 that may be present in computing system 100 for serving content to one or more consumers. Similar to computing device 110, head end server 150 is shown with a network interface 152 coupling head end server 150 to network 120, a processor 154 coupled to network interface 152, and a memory 156 coupled to processor 154. In some examples, network interface 152, processor 154, and memory 156 may be substantially similar to network interface 118, processor 112, and memory 114, respectively. And although head end server 150 is shown as a stand-alone computing device, head end server 150 may also be representative of a board added to another computing device, and/or as a virtual machine.

Memory 156 is also shown with a media server 158. Media server 158 is responsible for receiving requests for source media from media consumers via their respective media delivery devices 160, accessing the requested source media and associated content metadata (e.g., from the one or more media repositories 130), and then providing the source media and the associated content metadata to the respective media delivery device 160 via network 120.

Computing system 100 further includes media delivery device 160. Media delivery device 160 is representative of one or more media delivery devices 160 that may be present in computing system 100 that are used by one or more media consumers. In some embodiments, media delivery device 160 may be a media player, a smart phone, a tablet, a laptop, a personal computer, a smart television, a set-top box, and/or the like. Similar to computing device 110, media delivery device 160 is shown with a network interface 162 coupling media delivery device 160 to network 120, a processor 164 coupled to network interface 162, and a memory 166 coupled to processor 164. In some examples, network interface 162, processor 164, and memory 166 may be substantially similar to network interface 118, processor 112, and memory 114, respectively. And although media delivery device 160 is shown as a stand-alone computing device, media delivery device 160 may also be representative of a board added to another computing device, and/or as a virtual machine.

Memory 166 is also shown with a streaming module 167 and a supplemental content module 168. Streaming module 167 is responsible for receiving the source media from head end server 150 and presenting the source media to the media consumer for consumption. In some examples, streaming module 167 may include one or more applications and/or interfaces for aiding the media consumer in determining which source media is available for streaming, which source media has associated content metadata and can be used with the enhanced media techniques described further herein, and/or selecting source media for delivery by media delivery device 160.

Enhancing Media Experiences Using Supplemental Content

Supplemental content module 168 is responsible for receiving the content metadata from head end server 150 and using the content metadata along with preferences of one or more media consumers and/or additional real-time information to generate one or more virtual companions to consume the source media along with the one or more media consumers and provide supplemental content to enhance the media experience of the one or more media consumers.

As one non-limiting example, supplemental content module 168 may use local sensor devices and/or a login of the media consumer to determine an identify of the media consumer. Supplemental content module 168 may then access user preferences and/or history of the identified media consumer to learn more about the media consumer. For example, supplemental content module 168 may determine that the media consumer has a sarcastic sense of humor and that the media consumer has just selected a humorous video to watch. Supplemental content module 168 may generate a virtual viewing companion to watch the video along with the media consumer. The virtual viewing companion may be overlaid on the video, shown in an inset window, and/or the like. As streaming module 167 is streaming the video, supplemental content module 168 may periodically have the virtual viewing companion interject jokes, point out the foibles of the characters, point out the tropes of the humor genre, and/or the like. To avoid competing with the video, supplemental content module 168 may ask streaming module 167 to duck or pause the streaming of the video. Additionally, the virtual viewing companion may be animated and provide gestures, mimic actions depicted in the video, respond to comments or actions of the media consumer, and/or the like. Supplemental content module 168 may further monitor the media consumer using one or more audio or video sensors to determine that the media consumer is laughing at the jokes of the virtual viewing companion and continue to interject jokes, etc. based on the positive feedback. Later on, supplemental content module 168 may use the one or more audio or video sensors to determine that the media consumer is not paying attention or is falling asleep and, based on the content metadata, may try to capture the attention of the media consumer by saying, "Hey, pay attention! This next part is really funny."

As another non-limiting example, supplemental content module 168 may detect that a group of media consumers has selected to view a football game between two rival teams. Supplemental content module 168 may then use the one or more video sensors to determine that the media consumers are wearing jerseys and/or colors of the two rival teams. Supplemental content module 168 may then generate several virtual viewing companions dressed in the team colors that engage in playful banter among themselves, cheer, boo, etc. based on events taking place in the football game, and/or otherwise act like fans of the rival teams. Supplemental content module 168 may then use the one or more audio or visual sensors to determine whether the antics of the virtual viewing companions are appreciated by the group of media consumers and continue with it or note that the group of media consumers are not appreciative and tone down or phase out the banter, cheering, booing, etc.

As discussed above and further emphasized here, FIG. 1 is merely an example which should not unduly limit the scope of the claims. One of ordinary skill in the art would recognize many variations, alternatives, and modifications. According to some embodiments, the various modules may be located in different computing devices and/or distributed among multiple computing devices. In some examples, metadata generation module 116 may be located in head end server 150 and/or distributed between head end server 150 and one or more computing devices similar to computing device 110. In some examples, portions of supplemental content module 168 may be distributed between media delivery device 160 and/or one or more servers or computing devices similar to computing device 110.

Figure 3:
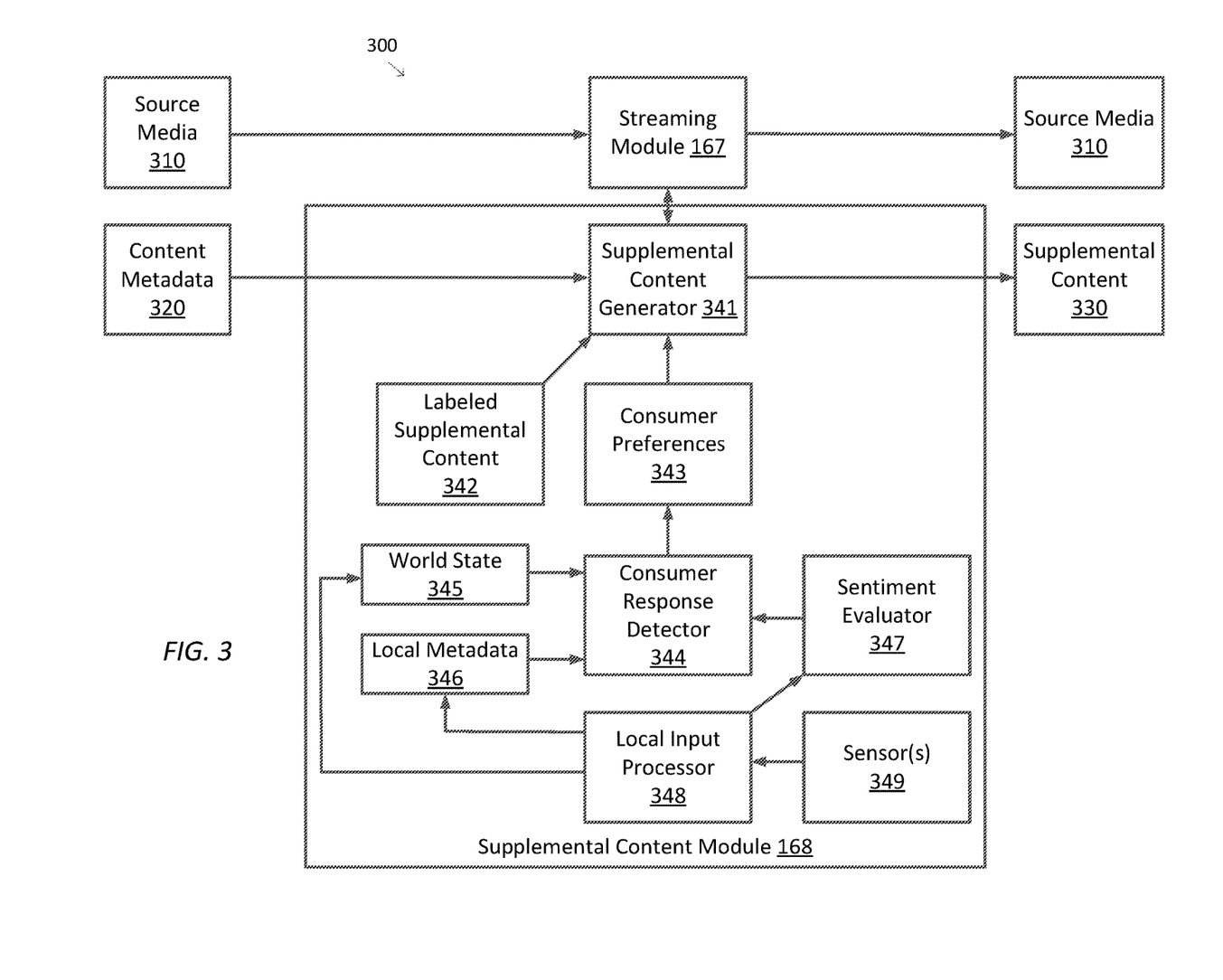
FIG. 3 is a more detailed illustration of a system for delivering source media and supplemental content to one or more media consumers to implement one or more aspects of the various embodiments.

FIG. 3 is a more detailed illustration of a system 300 for delivering source media and supplemental content to one or more media consumers to implement one or more aspects of the various embodiments. As shown in FIG. 3, system 300 includes streaming module 167 and supplemental content module 168. In some embodiments, streaming module 167 and/or supplemental content module 168 may be operating on media delivery device 160 and/or distributed across multiple media devices.

Streaming module 167 receives source media 310 for delivery to one or more media consumers. In some examples, source media 310 may be provided by head end server 150 and media server 158. In some examples, streaming module 167 may further aid the one or more media consumers in the selection and request of the source media 310. In some examples, streaming module 167 may then deliver source media 310 to the one or more media consumers using one or more audio and/or video devices (not shown) such as one or more speakers, one or more video display devices, one or more holographic devices, and/or the like. In some examples, streaming module 167 may also receive input from the one or more media consumers to control media delivery features such as volume control, pause, rewind, fast forward, and/or the like. In some examples, streaming module 167 may further receive requests from supplemental content module 168 to duck and/or pause source media 310 when supplemental content is being delivered to the one or more media consumers as is described in further detail below.

Supplemental content module 168 receives content metadata 320 associated with source media 310 and uses content metadata 320 and other information to generate supplemental content 330 for delivery to the one or more media consumers. In some examples, content metadata 320 may be provided by head end server 150 and media server 158 along with source media 310. In some examples, content metadata 320 includes time-aligned content metadata and/or global metadata associated with source media 310. In some examples, supplemental content module 168 may further send requests to streaming module 167 to have streaming module 167 duck and/or pause source media 310 when supplemental content 330 is being delivered to the one or more media consumers.

Supplemental content 330 includes one or more supplemental content elements that are meant to enhance the media consumption experiences of the one or more media consumers. In some examples, the one or more supplemental content elements may include one or more audio elements, video elements, holographic elements, and/or the like. In some examples, supplemental content 330 may include one or more virtual companions to consume source media 310 along with the one or more media consumers. In some examples, the one or more virtual companions may interact with each other, with source media 310, and/or the one or more media consumers. In some examples, the one or more virtual companions may make statements (e.g., make observations, crack jokes, provide information about source media 310, converse with the one or more media consumers and/or each other, and/or the like), inject sound effects, perform actions (e.g., make gestures, perform actions, sing along, mimic characters and/or events in source media 310, react to events in source media 310, and/or the like), and/or otherwise exhibit behaviors that may be performed by a media consumer. a commentator supplementing source media 310, and/or the like. In some examples, the one or more supplemental content elements may include one or more virtual objects to be interacted with the by the one or more virtual companions, to interject into source media 310, to provide information and/or point out aspects of source media 310, and/or the like. In some examples, the one or more supplemental content elements may be presented as off-screen audio (e.g., using directional sound techniques), video elements on a video playback device (e.g., as superimposed, inset, overlaid, around the borders of, and/or the like video elements of source media 310), video elements projected on one or more objects around the video playback device, holographic elements projected around the video playback device, and/or the like.

Supplemental content module 168 includes a supplemental content generator 341 that receives content metadata 320. Supplemental content generator 341 then uses content metadata 320 along with labeled supplemental content 342 and consumer preferences 343 to generate supplemental content 330. In some examples, supplemental content generator 341 may additionally send requests to streaming module 167 to have streaming module 167 duck and/or pause source media 310 when supplemental content 330 is being delivered. In some examples, supplemental content generator 341 may use content metadata 320 and/or consumer preferences 343 to select supplemental content elements from among labeled supplemental content 342 that are relevant to content metadata 320 and the preferences of the one or more media consumers for inclusion in supplemental content 330. In some examples, supplemental content generator 341 may further modify and/or customize the supplemental content elements based on content metadata 320 and/or the preferences of the one or more media consumers so that the supplemental content 330 is appropriate for source media 310 and the preferences of the one or more media consumers. In some examples, supplemental content generator 341 may use one or more programs, one or more scripts, one or more rule bases, and/or one or more classification modules to select and/or customize the supplemental content elements for inclusion in supplemental content 330. In some examples, each of the one or more classification modules may include one or more machine learning modules (e.g., one or more neural networks) and/or the like. In some examples, the one or more machine learning modules may be trained based on training data that includes content metadata, labeled supplemental content, and consumer preferences as well as ground truth values indicating the appropriateness of various supplement content elements for inclusion in supplemental content 330. In some embodiments, supplemental content generator 341 may additionally and/or alternatively generate additional supplemental content elements that are not derived from elements included in labeled supplemental content 342.

Labeled supplemental content 342 includes a collection of numerous supplemental content elements that may serve as a basis for supplemental content elements to include in supplemental content 330. In some examples, each of the labeled supplemental content elements may be labeled and/or indexed for efficient retrieval by supplemental content generator 341. The supplemental content elements may include one or more characters, virtual companions, virtual objects, props, animations, gestures, logos, color schemes, lighting schemes, lines of dialog, accents, audio clips, video clips, sound effects, and/or the like. In some examples, any of the supplemental content elements may be parameterized to facilitate customization by supplemental content generator 341. In some examples, the supplemental content elements may further include one or more templates and/or scripts that may be used to customize and/or parameterize any of the other supplemental content elements, combine supplemental content elements together, and/or the like. And although labeled supplemental content 342 is shown local to supplement content module 168 in FIG. 3, one or more of the supplemental content elements in labeled supplemental content 342 may be accessed at run-time and/or loaded at run-time from one or more remote labeled supplemental content repositories.

Consumer preferences 343 include information about one or more media consumers that are usable by supplemental content generator 341 to customize supplemental content 330 specifically for the one or more media consumers that are listening to and/or viewing source media 310. In some examples, the consumer preferences 343 may include preferences associated with specific media consumers, preferences for groups of media consumers (e.g., preferences for a family that may be different from preferences for an adult media consumer), preferences based on media consumed using a specific media delivery device 160, and/or the like. In some examples, consumer preferences 343 may be stored locally with media delivery device 160, retrieved from a remote location (e.g., head end server 150, the one or more media repositories 130 and/or in the cloud) so that consumer preferences 343 are portable, and/or some combination of both. In some examples, remote storage of consumer preferences 343 allows consumer preferences 343 to be used with multiple media delivery devices 160. Additionally and/or alternatively, in some embodiments, consumer preferences 343 may also be used by streaming module 167 in suggesting and/or selecting source media 310 for consumption by the one or more media consumers.

In some examples, consumer preferences 343 may include historical preferences that may be derived from tracking the media consumption of the one or more media consumers over time. In some examples, the historical preferences may be derived from a history of source media selected for consumption by the one or more media consumers. In some examples, these historical preferences may include the media consumption history, preferred programs, preferred characters, preferred actors, preferred directors, preferred genres, preferred types of live content (e.g., news, sports, particular sports teams, etc.), and/or the like. In some examples, the historical preferences may include information about the sense of humor, preferred types of supplemental content, aggregate reactions to previously presented supplemental content, and/or the like of each of the one or more media consumers.

In some examples, consumer preferences 343 may include transient preferences that may be determined by the reactions of the one or more media consumers to source media 310 currently being consumed, recently presented supplemental content 330, and/or some combination of both. In some examples, the transient preferences may include information about one or more of a current alertness level of the one or more media consumers, such as whether the one or more media consumers are paying attention and/or reacting to source media 310 and/or supplemental content 330, whether the one or media consumers are reacting positively and/or negatively to supplemental content 330, and/or the like. In some examples, the transient preferences may be provided by a consumer response detector 344. In some examples, the transient preferences may be used to create and/or modify the historical preferences of the one or more media consumers. In some examples, the transient preferences may be given greater weight and/or emphasis by supplemental content generator 341 when supplemental content elements are selected and/or generated for inclusion in supplemental content 330.

Consumer response detector 344 monitors the one or more media consumers and/or the environment of the one or more media consumers to provide feedback to consumer preferences 343 that may be incorporated into the transient preferences. To provide the feedback, consumer response detector 344 considers information about world state 345, local metadata 346, and/or input from a sentiment evaluator 347. In some examples, consumer response detector 344 may use one or more programs, one or more scripts, one or more rule bases, and/or one or more classification modules to evaluate information about world state 345, local metadata 346, and/or a current sentiment of the one or more media consumers to provide the feedback to consumer preferences 343. In some examples, each of the one more classification modules may include one or more machine learning modules (e.g., one or more neural networks) and/or the like. In some examples, the one or more machine learning modules may be trained based on training data that includes world state information, local metadata, and sentiment information of one or more media consumers as well as ground truth values indicating the likelihood of various types of transient preferences for the one or more media consumers.

World state 345 includes general information about the environment around the one or more media consumers. In some examples, world state 345 may include information about one or more of lighting conditions, current and/or recent weather, a current time, topical news and events, a location where the media is being consumed, a number of media consumers, and/or the like. In some examples, portions of world state 345 (e.g., the weather, topical news and events, and/or the like) may be retrieved from the one or more data sources 140. In some examples, portions of world state 345 (e.g., the number of media consumers, lighting conditions, and/or the like) may be provided by a local input processor 348.

Local metadata 346 includes more specific information about the one or more media consumers. In some examples, local metadata 346 may include an identity of one or more of the media consumers. In some examples, the identify of one or more of the media consumers may be determined based on one or more of whether a media consumer has logged into supplemental content module 168, selected one or more profiles, facial recognition, voice recognition, a detection of one or more wearable and/or portable electronic devices (e.g., recognizing a paired mobile phone), and/or the like. In some examples, portions of the local metadata 346 may be provided by local input processor 348.

Sentiment evaluator 347 determines how the one or media consumers are reacting to source media 310 and/or supplemental content 330. In some examples, sentiment evaluator 347 determines whether the one or more media consumers are reacting positively or negatively, such as by providing information to consumer response detector 344 on a like to no-like spectrum. In some examples, sentiment evaluator 347 provides an emotional and/or sentiment state of the one or more media consumers to consumer response detector 344. In some examples, the emotional and/or sentiment state may be provided as discrete labels (e.g., happy, sad, interested, and/or the like) and/or on a spectrum (e.g., one or more of valence, arousal, and/or the like). In some examples, sentiment evaluator 347 provides information about an engagement level of the one or more media consumers. In some examples, the engagement may be provided as discrete labels (e.g., active, still, bored, and/or the like) and/or as a value on an engagement spectrum. In some examples, sentiment evaluator 347 may determine the reactions of the one or more media consumers based on information provided by local input processor 348, such as information about facial expressions, emotional reactions (e.g., whether the one or more media consumers are crying, laughing, and/or the like), and/or the like. In some examples, sentiment evaluator 347 may use one or more programs, one or more scripts, one or more rule bases, and/or one or more classification modules to determine one or more of the reaction, emotional state, sentiment state, engagement, and/or the like. In some examples, each of the one more classification modules may include one or more machine learning modules (e.g., one or more neural networks) and/or the like. In some examples, the one or more machine learning modules may be trained based on training data that includes information about activities and/or reactions of one or more media consumers as well as ground truth values indicating appropriate labels and/or values for reaction, emotional state, sentiment state, engagement, and/or the like.

Local input processor 348 receives information from one or more sensors 349. In some examples, the one or sensors 349 may include one or more audio input devices, image capture devices, wireless device detectors (e.g., to identify wearables or other electronic devices of the one or more media consumers), and/or the like. Local input processor 348 analyzes the signals and/or data from the one or more sensors 349 to provide portions of world state 345, local metadata 346, and/or input for sentiment evaluator 347. In some examples, local input processor 348 includes one or more modules for determining information such as how many media consumers are present, an identity of one or more of the media consumers, logos that are present, color schemes, activities of the one or more media consumers, emotional state of the one or more media consumers, and/or the like. In some examples, each of the one or more modules may use one or more image, facial, object, voice, activity, action, emotional, electronic object and/or the like recognition techniques. In some examples, the one or more modules may use one or more programs, one or more scripts, one or more rule bases, and/or one or more classification modules to evaluate the signals and/or data from the one or more sensors 349. In some examples, each of the one more classification modules may include one or more machine learning modules (e.g., one or more neural networks) and/or the like. In some examples, the one or more machine learning modules may be trained based on training data that includes signals and/or data from one or more sensors as well as ground truth values indicating appropriate output for each of the machine learning modules based on the type of information the respective machine learning module is trained to identify.

As discussed above and further emphasized here, FIG. 3 is merely an example which should not unduly limit the scope of the claims. One of ordinary skill in the art would recognize many variations, alternatives, and modifications. According to some embodiments, supplemental content module 168 may include more than one of supplemental content generator 341, consumer response detector 344, and/or sentiment evaluator 347. In some examples, separate supplemental content generators 341, consumer response detectors 344, and/or sentiment evaluators 347 may be associated with different media consumers and/or groups of media consumers. In some examples, each separately identified media consumer may have their own supplemental content generator 341 to generate supplement content elements for that media consumer based on consumer preferences 343 determined by the consumer response generator 344 and/or the sentiment evaluator 347 for that media consumer. In some examples, the multiple supplemental content generators 341 may include modules for interacting with and/or cooperating with each other so that the virtual companions of each of the supplemental content generators 341 may appropriately interact and/or coordinate with each other. In some examples, labeled supplemental content 342 may include elements and/or templates for interactions between two or more virtual companions being generated by different supplemental content generators 341.

Generating Supplemental Content

Figure 4:
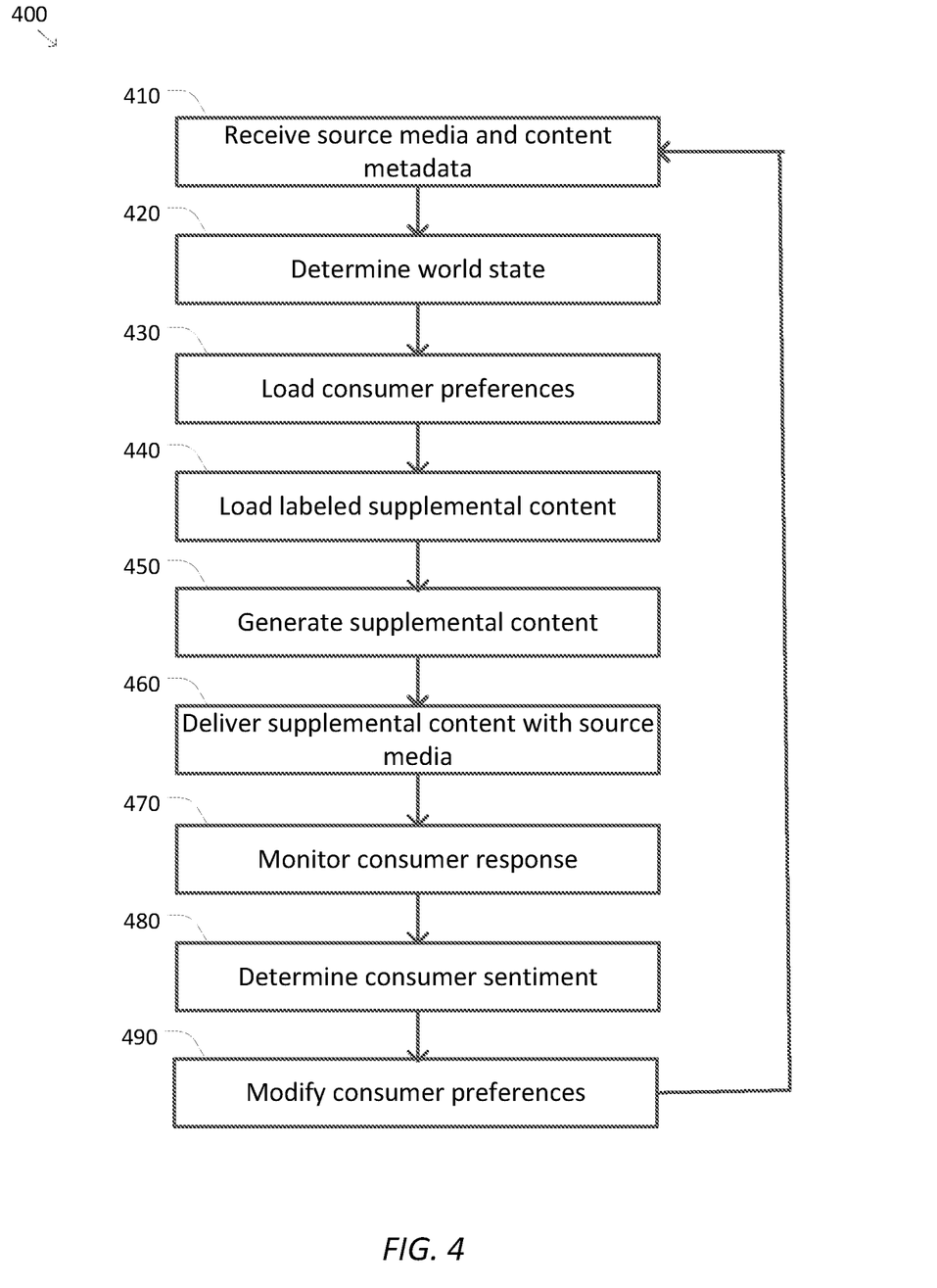
FIG. 4 sets forth a flow diagram of method steps of a method for delivering source media and supplemental content to one or more media consumers to implement one or more aspects of the various embodiments.

FIG. 4 sets forth a flow diagram of method steps of a method 400 for delivering source media and supplemental content to one or more media consumers to implement one or more aspects of the various embodiments. One or more of the steps of FIG. 4 may be implemented, at least in part, in the form of executable code stored in one or more non-transitory, tangible, computer-readable storage media that when run by one or more processors (e.g., processor 164 in media delivery device 160) may cause the one or more processors to perform one or more of the steps. In some embodiments, the steps of FIG. 4 may be performed by one or more modules, such as streaming module 167 and/or supplemental content module 168. In some embodiments, the steps of FIG. 4 may be used to deliver source media and supplement content to one or more media consumers for consumption. Although the steps of FIG. 4 are described with reference to the embodiments of FIGS. 1 and 3, persons skilled in the art will understand that any system configured to implement the steps of FIG. 4, in any order, falls within the scope of the embodiments. For example, the embodiments of FIG. 4 may be adapted to other arrangements of computing devices, functional blocks and modules, and/or the like.

In some embodiments, the steps of method 400 may be performed in orders other than those implied by the arrangement of the blocks in FIG. 4. In some examples, step 490 may be omitted when there are no modifications to consumer preferences. In some examples, any of steps 420, 430, 440, 450, 460, 470, and/or 480 may be performed concurrently.

At a step 410, source media 310 and content metadata 320 are received. In some examples, source media 310 and content metadata 320 are received from head end server 150 using media server 158. In some examples, source media 310 and content metadata 320 are retrieved by head end server 150 and/or media server 158 from the one or more media repositories 130. In some examples, source media 310 may be received by streaming module 167 and content metadata 320 may be received by supplemental content module 168. In some examples, source media 310 may be selected by one or more media consumers. In some examples, source media 310 and/or content metadata 320 may be streamed to streaming module 167 and supplemental content module 168, respectively.

At a step 420 world state 345 is determined. In some examples, world state 345 may include one or more of information about one or more of lighting conditions, current and/or recent weather, a current time, topical news and events, a location where the media is being consumed, a number of media consumers, and/or the like. In some examples, portions of world state 345 may be generated by local input processor 348 based on signals and data from the one or more sensors 349 and/or retrieved from the one or more data sources 140.

At a step 430, consumer preferences 343 are loaded. In some examples, consumer preferences 343 may be loaded from local storage and/or from remote storage, such as from the one or more media repositories 130 and/or the one or more data sources 140. In some examples, consumer preferences 343 include historical and/or transient preferences of the one or more media consumers that are consuming source media 310. In some examples, the historical preferences are determined from a media consumption history of the one or more media consumers and the transient preferences are determined from reactions of the one or more media consumers to source media 310 and supplemental content 330 and/or information about the location where source media 310 is being consumed.

At a step 440, labeled supplemental content 342 is loaded. In some examples, labeled supplemental content 342 may be loaded from local storage and/or from remote storage, such as from the one or more media repositories 130 and/or the one or more data sources 140. In some examples, labeled supplemental content 342 may include numerous supplemental content elements that may be selected from and/or customized to generate supplement content 330.

At a step 450, supplemental content 330 may be generated. In some examples, supplemental content 330 may be generated by supplemental content generator 341 based on world state 345 determined during step 430, consumer preferences 343 loaded during step 430 and/or labeled supplemental content 342 loaded during step 440. In some examples, the transient preferences in consumer preferences 343 are given more weight when generating supplemental content 330 than the historical preferences included in consumer preferences 343. In some examples, supplemental content 330 may include one or more audio, video, and/or holographic elements. In some examples, supplemental content 330 may include one or more virtual companions that consume source media 310 along with the one or more media consumers. In some examples, the one or more virtual companions may provide commentary, supplemental information, and/or the like about source media 310. In some examples, the one or more virtual companions may interact and/or react to source media 310, each other, and/or the one or more media companions.

At a step 460, supplemental content 330 is delivered with source media 310 to the one or more media consumers. In some examples, source media 310 and/or supplemental content 330 may be delivered using one or more speakers, one or more video devices, and/or one or more holographic devices. In some examples, supplemental content 330 is timed to correspond to actions, dialog, content, and/or the like in source media 310. In some examples, delivery of source media 310 may be ducked and/or paused while supplemental content 330 is being delivered.

At a step 470, a response of the one or more media consumers is monitored. In some examples, the response may be determined by local input processor 348 using signals and/or data from one or more sensors, such as one or more audio input devices, one or more image capture devices, one more electronic device detection devices, and/or the like. In some examples, the response of the one or more media consumers may be used to determine local metadata 346. In some examples, local metadata 346 may include one or more of information about one or more of an identify of one or more of the media consumers, other activities of the one or more media consumers, logos and/or colors being worn by the one or more media consumers, an alertness level of the one or more media consumers, and/or the like. In some examples, the response of the one or more media consumers may also be used to provide labels and/or other information for determining a sentiment, emotional state, engagement, and/or the like of the one or more media consumers.

At a step 480, a sentiment of the one or more media consumers is determined by sentiment evaluator 347. In some examples, the sentiment may be determined based on the response of the one or more media consumers determined during step 470. In some examples, the sentiment of the one or more media consumers may include one or more of a reaction of the one or more media consumers to source media 310 and/or supplemental content 330, emotional or sentiment states of the one or more media consumers, an interest or engagement level of the one or more media consumers, and/or the like.

At a step 490, consumer preferences 343 are modified by consumer response detector 344. In some examples, consumer response detector 344 may modify consumer preferences based on one or more of world state 345 determined during step 420, local metadata determined during step 470, and/or the sentiment of the one or more media consumers determined during step 480. In some examples, consumer response detector 344 modifies the transient preferences in consumer preferences 343.

After consumer preferences 343 is updated based on the monitored response of the one or more media consumers and/or the sentiment of the one or more media consumers, additional source media 310 and content metadata 320 are received and new supplemental content 330 is generated and delivered by repeating method 400.

In sum, the disclosed techniques may be used to analyze source media to determine content metadata that can be used to deliver supplemental content to one or more media consumers along with the source media. The supplemental content may include one or more supplemental content elements that may include, for example, one or more virtual companions to consume the source content along with the one or more media consumers. The supplemental content elements may include one or more audio, visual, and/or holographic elements to deliver to the one or more media consumers based on the content metadata, labeled supplemental content, and/or historical and transient preferences of the one or more media consumers. The transient preferences may be based on world state information, local metadata about a location where the source media is being consumed, and reactions of the one or more media consumers to the source media and the supplemental content. Delivery of the supplemental content with the source media may increase an emotional response, enjoyment, and/or engagement of the one or more media consumers with the source media.

At least one technical advantage of the disclosed techniques relative to the prior art is that the disclosed techniques provide a more interactive and immersive media experience. In addition, the disclosed techniques allows for customization of the media consumption experience where supplemental content is provided to the media consumer in real-time based on the source media being consumed as well as the reactions of the media consumer to the source media and the supplemental content, real-time events, and/or the like. Further, the disclosed techniques provide for one or more virtual media consumption companions that are able to consume the source media along with the media consumer and to interact with the media consumer in a way that is customized to the media consumer and the source media being consumed. In addition, the supplemental content generated by the disclosed techniques is better able to interact with media consumers, reinforce emotional responses of media consumers, and/or increase an engagement level of media consumers than prior art approaches. These technical advantages provide one or more technological advancements over prior art approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

1. According to some embodiments, a computer-implemented method for providing supplemental content along with source media comprises receiving source media and content metadata associated with the source media, generating supplemental content based on the content metadata and preferences of one or more media consumers, and delivering the supplement content along with the source media to the one or more media consumers.

2. The computer-implemented method of clause 1, wherein the source media comprises audio media or audio-visual media.

3. The computer-implemented method of clause 1 or clause 2, further including determining a response of the one or more media consumers to the supplemental content, modifying the preferences of the one or more media consumers based on the determined response generating additional supplemental content based on the content metadata and the modified preferences, and delivering the additional supplemental content to the one or more media consumers along with the source media.

4. The computer-implemented method of any of clauses 1-3, wherein the supplemental content comprises one or more audio elements, video elements, or holographic elements.

5. The computer-implemented method of any of clauses 1-4, wherein the supplemental content is customized based on an identity of at least one of the one or more media consumers.

6. The computer-implemented method of any of clauses 1-5, wherein the supplemental content comprises a virtual companion that consumes the source media along with the one or more media consumers.

7. The computer-implemented method of any of clauses 1-6, wherein the virtual companion reacts to one or more of the source media, another virtual companion, or the one or more media consumers.

8. The computer-implemented method of any of clauses 1-7, wherein the virtual companion interacts with one or more of the media consumers or another virtual companion.

9. The computer-implemented method of any of clauses 1-8, wherein determining the response comprises determining at least one of a sentiment of the one or more media consumers, an engagement of the one or more media consumers, or an emotion of the one or more media consumers.

10. The computer-implemented method of any of clauses 1-9, wherein delivering the supplemental content along with the source media comprises ducking or pausing the source media when the supplemental content is delivered.

11. According to some embodiments, one or more non-transitory computer-readable storage media including instructions that, when executed by one or more processors, cause the one or more processors to provide supplemental content along with source media by performing steps comprising receiving source media and content metadata associated with the source media, generating supplemental content based on the content metadata and preferences of one or more media consumers, and delivering the supplement content along with the source media to the one or more media consumers.

12. The one or more non-transitory computer-readable storage media of clause 11, wherein the supplemental content comprises a virtual companion that consumes the source media along with the one or more media consumers.

13. The one or more non-transitory computer-readable storage media of clause 11 or clause 12, wherein the content metadata includes at least one of global content metadata or time-aligned content metadata.

14. The one or more non-transitory computer-readable storage media of any of clauses 11-13, wherein the preferences of the one or more media consumers include at least one of historical preferences or transient preferences of the one or more media consumers.

15. The one or more non-transitory computer-readable storage media of any of clauses 11-14, wherein generating the supplemental content comprises giving greater weight to the transient preferences than to the historical preferences.

16. The one or more non-transitory computer-readable storage media of any of clauses 11-15, further comprising determining the transient preferences based on one or more of a world state associated with a location where the source media is being consumed, local metadata determined from one or more sensors at the location, a sentiment of the one or more media consumers, an engagement of the one or more media consumers, or an emotion of the one or more media consumers.

17. The one or more non-transitory computer-readable storage media of any of clauses 11-16, wherein the steps further comprise analyzing the source media and determining the content metadata based on the analyzing.

18. The one or more non-transitory computer-readable storage media of any of clauses 11-17, wherein determining the content metadata is further based on at least one of metadata retrieved from one or more data sources or input from one or more test media consumers.

19. According to some embodiments, a computing device comprising a memory; and one or more processors coupled to the memory, wherein the one or more processors are configured to receive source media and content metadata associated with the source media, generate a virtual companion based on the content metadata and preferences of one or more media consumers, generate supplemental content to be delivered by the virtual companion, and have the virtual companion deliver the supplemental content to the one or media consumers along with the source media.

20. The computing device of clause 19, wherein to generate the supplemental content, the one or more processors are configured to select a first supplemental content element from labeled supplemental content or customize a second supplemental content element from the labeled supplemental content.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer readable program code embodied thereon.

Any combination of one or more computer-readable medium(s) may be utilized. The computer-readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for providing supplemental content along with source media, the method comprising:
   receiving source media and content metadata associated with the source media;
   generating supplemental content based on a subset of the content metadata that is associated with a first portion of the source media and preferences of one or more media consumers, wherein the generated supplemental content does not include the first portion of the source media;
   delivering the generated supplemental content along with the first portion of the source media to the one or more media consumers;
   receiving video sensor data captured by one or more video sensors that indicates a first reaction of the one or more media consumers to at least one of the first portion of the source media or the supplemental content;
   determining at least one of a first emotional state of the one or more media consumers, a first sentiment state of the one or more media consumers, or a first level of engagement of the one or more media consumers based on the video sensor data indicating the first reaction; and
   generating additional supplemental content based on the at least one of the first emotional state, the first sentiment state, or the first level of engagement.

2. The computer-implemented method of claim 1, wherein the source media comprises audio media or audio-visual media.

3. The computer-implemented method of claim 1, further comprising:
   modifying the preferences of the one or more media consumers based on the at least one of the first emotional state, the first sentiment state, or the first level of engagement;
   generating the additional supplemental content based on the content metadata and the modified preferences; and
   delivering the additional supplemental content to the one or more media consumers along with the source media.

4. The computer-implemented method of claim 1, wherein the generated supplemental content comprises one or more audio elements, video elements, or holographic elements.

5. The computer-implemented method of claim 1, wherein the generated supplemental content is customized based on an identity of at least one of the one or more media consumers.

6. The computer-implemented method of claim 1, wherein the generated supplemental content comprises a virtual companion that consumes the source media along with the one or more media consumers.

7. The computer-implemented method of claim 6, wherein the virtual companion reacts to one or more of the source media, another virtual companion, or the one or more media consumers.

8. The computer-implemented method of claim 6, wherein the virtual companion interacts with one or more of the media consumers or another virtual companion.

9. The computer-implemented method of claim 1, wherein delivering the generated supplemental content along with the first portion of the source media comprises ducking or pausing the first portion of the source media when the generated supplemental content is delivered.

10. One or more non-transitory computer-readable storage media including instructions that, when executed by one or more processors, cause the one or more processors to provide supplemental content along with source media by performing steps comprising:
receiving source media and content metadata associated with the source media;
generating supplemental content based on a subset of the content metadata that is associated with a first portion of the source media and preferences of one or more media consumers, wherein the generated supplemental content does not include the first portion of the source media;
delivering the generated supplemental content along with the first portion of the source media to the one or more media consumers;
receiving video sensor data captured by one or more video sensors that indicates a first reaction of the one or more media consumers to at least one of the first portion of the source media or the supplemental content;
determining at least one of a first emotional state of the one or more media consumers, a first sentiment state of the one or more media consumers, or a first level of engagement of the one or more media consumers based on the video sensor data indicating the first reaction; and
generating additional supplemental content based on the at least one of the first emotional state, the first sentiment state, or the first level of engagement.

11. The one or more non-transitory computer-readable storage media of claim 10, wherein the generated supplemental content comprises a virtual companion that consumes the first portion of the source media along with the one or more media consumers.

12. The one or more non-transitory computer-readable storage media of claim 10, wherein the content metadata includes at least one of global content metadata or time-aligned content metadata.

13. The one or more non-transitory computer-readable storage media of claim 10, wherein the preferences of the one or more media consumers include at least one of historical preferences or transient preferences of the one or more media consumers.

14. The one or more non-transitory computer-readable storage media of claim 13, wherein generating the supplemental content comprises giving greater weight to the transient preferences than to the historical preferences.

15. The one or more non-transitory computer-readable storage media of claim 13, further comprising determining the transient preferences based on one or more of a world state associated with a location where the source media is being consumed, local metadata determined from the one or more video sensors at the location, a sentiment of the one or more media consumers, an engagement of the one or more media consumers, or an emotion of the one or more media consumers.

16. The one or more non-transitory computer-readable storage media of claim 10, wherein the steps further comprise:
analyzing the source media; and
determining the content metadata based on the analyzing.

17. The one or more non-transitory computer-readable storage media of claim 16, wherein determining the content metadata is further based on at least one of metadata retrieved from one or more data sources or input from one or more test media consumers.

18. A computing device, comprising:
a memory; and
one or more processors coupled to the memory;
wherein the one or more processors are configured to:
receive source media and content metadata associated with the source media;
generate a virtual companion based on the content metadata and preferences of one or more media consumers;
generate supplemental content to be delivered by the virtual companion, wherein the supplemental content is generated based on a subset of the content metadata that is associated with a first portion of the source media and does not include the first portion of the source media;
have the virtual companion deliver the generated supplemental content to the one or media consumers along with the first portion of the source media;
receive video sensor data captured by one or more video sensors that indicates a first reaction of the one or more media consumers to at least one of the first portion of the source media or the generated supplemental content;
determine at least one of a first emotional state of the one or more media consumers, a first sentiment state of the one or more media consumers, or a first level of engagement of the one or more media consumers based on the video sensor data indicating the first reaction, wherein the first level of engagement comprises a value on an engagement spectrum; and
generate additional supplemental content based on the at least one of the first emotional state, the first sentiment state, or the value on the engagement spectrum that is determined based on the video sensor data indicating the first reaction.

19. The computing device of claim 18, wherein to generate the supplemental content, the one or more processors are configured to select a first supplemental content element from labeled supplemental content or customize a second supplemental content element from the labeled supplemental content.

* * * * *